United States Patent
Singer et al.

(10) Patent No.: US 9,390,382 B2
(45) Date of Patent: Jul. 12, 2016

(54) TEMPLATE REGULARIZATION FOR GENERALIZATION OF LEARNING SYSTEMS

(71) Applicant: Google Inc., Mountain View, CA (US)

(72) Inventors: Yoram Singer, Palo Alto, CA (US); Tal Shaked, Los Altos, CA (US); Tushar Deepak Chandra, Los Altos, CA (US); Tze Way Eugene Ie, San Francisco, CA (US); James Vincent McFadden, San Francisco, CA (US); Jeremiah Harmsen, San Jose, CA (US); Kristen Riedt LeFevre, San Francisco, CA (US)

(73) Assignee: Google Inc., Mountain View, CA (US)

( * ) Notice: Subject to any disclaimer, the term of this patent is extended or adjusted under 35 U.S.C. 154(b) by 179 days.

(21) Appl. No.: 14/142,970

(22) Filed: Dec. 30, 2013

(65) Prior Publication Data
US 2015/0186794 A1 Jul. 2, 2015

(51) Int. Cl.
*G06N 99/00* (2010.01)
(52) U.S. Cl.
CPC .................... *G06N 99/005* (2013.01)
(58) Field of Classification Search
CPC ....................................... G06N 3/04
USPC ........................................... 706/46
See application file for complete search history.

(56) References Cited

U.S. PATENT DOCUMENTS

2014/0079297 A1* 3/2014 Tadayon ............... G06K 9/00
382/118

OTHER PUBLICATIONS

Rendle, "Factorization Machines with libFM", ACM Transactions on Intelligent Systems and Technology, vol. 3, No. 3, Article 57, Publication date: May 2012.

* cited by examiner

*Primary Examiner* — Stanley K Hill
*Assistant Examiner* — Ola Olude Afolabi
(74) *Attorney, Agent, or Firm* — Fish & Richardson P.C.

(57) ABSTRACT

Systems and techniques are disclosed for training a machine learning model based on one or more regularization penalties associated with one or more features. A template having a lower regularization penalty may be given preference over a template having a higher regularization penalty. A regularization penalty may be determined based on domain knowledge. A restrictive regularization penalty may be assigned to a template based on determining that a template occurrence is below a stability threshold and may be modified if the template occurrence meets or exceeds the stability threshold.

20 Claims, 7 Drawing Sheets

Fig. 7c

TEMPLATE REGULARIZATION FOR GENERALIZATION OF LEARNING SYSTEMS

BACKGROUND

Conventionally, machine learning models are not trained on data that is representative of the distribution of data that the model will be applied to. As an example, a model may be configured to predict a video that a user is likely to watch, based on a currently viewed video. The training data used to generate the model is likely not to include features about new videos that are not part of the corpus of videos at the current time. Accordingly, the model may not perform optimally based only on training data that is not representative of the distribution of the data that the model is applied to.

BRIEF SUMMARY

According to implementations of the disclosed subject matter, a model comprising multiple templates may be received. The model may be used to train a machine learning system. A regularization penalty may be assigned to each of the multiple templates and each of the multiple templates may be associated with one or more features. The machine learning system may be trained using the model such that, during training, a template having a lower regularization penalty is emphasized over a template having a higher regularization penalty. The regularization penalty may be based on domain knowledge such as historic data associated with one or more features and/or user input. A first template occurrence may be determined to be below a stability threshold and a restrictive regularization penalty may be assigned to the first template based on the determination. A template occurrence may meet or exceed a stability threshold and, accordingly, the regularization penalty for the template may be modified from a higher regularization penalty to a lower regularization penalty.

Systems and techniques according to the present disclosure may assign regularization penalties to templates based on domain knowledge. The regularization penalties may enable directing a machine learning system to generate models that prefer using features from certain templates when fitting data. Additional characteristics, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Techniques according to the present disclosure may train a machine learning system by assigning regularization penalties to templates. A model used to train a machine learning system may comprise multiple templates. The templates may be associated with one or more features, as disclosed herein. A regularization penalty may be assigned to each template and the machine learning system may be trained using the model such that a feature associated with a template having a lower regularization penalty is given preference over a feature associated with a template having a higher regularization penalty. A regularization penalty, as disclosed herein, may control model complexity and improve model generalization such that a model trained by applying regularization penalties based on domain knowledge (e.g., based on historic data and/or user input) may be better suited to be applied to a distribution of data that is different than the training data used to train the machine learning model. A restrictive regularization penalty may be applied to a template until the number of occurrences of the template in the distribution of data exceeds a stability threshold amount.

Figure 6:
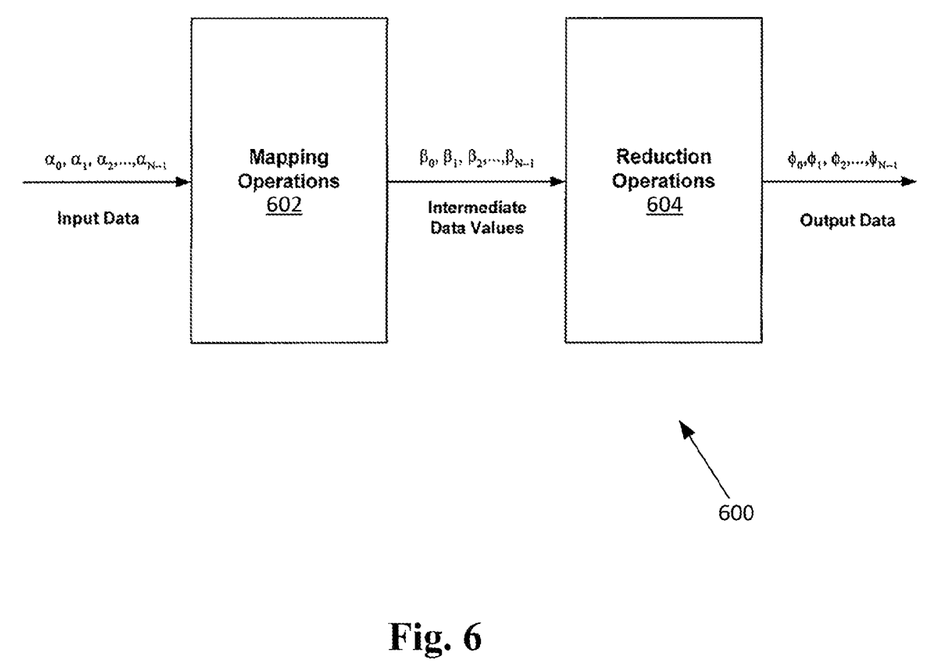
FIG. 6 shows an example process for a mapreduce operation, according to an implementation of the disclosed subject matter.

Techniques described herein can be applied to large-scale data processing and may be applied to large scale parallel data processing for machine learning. Such large-scale processing may be performed in a distributed data processing system, such as a datacenter or a network of datacenters. For example, large-scale Internet services and the massively parallel computing infrastructure that support such services may employ warehouse-sized computing systems, made up of thousands or tens of thousands of computing nodes. FIG. 6 shows a general overview of a large-scale data processing model 600 that may be applied herein to train a machine learning system. The data processing model 600 may include mapping operations 602 and reduction operations 604. The mapping operations 602 may apply one or more mapping operations to a set of input data $\alpha_i$ (e.g., text files, records, logs, sorted maps, etc.) to provide a set of intermediate data values $\beta_i$. The reduction operations 604 may apply one or more reduction operations to the set of intermediate data values $\beta_i$ to provide a set of output data $\phi_i$ (e.g., tables, sorted maps, record I/O, etc.). According to one or more implementations, the mapping operations 602 may be implemented by one or more application-specific mapping functions, which map a set of input data $\alpha_i$ to a set of intermediate data values $\beta_i$. The intermediate data values $\beta_i$ may be stored in one or more intermediate data structures. Some examples of intermediate data structures include files, buffers, histograms, count tables and any other suitable data structure or device for storing digital information. The intermediate data values $\beta_i$ are processed by the reduction operations 604, which may be implemented by one or more application-specific reduction functions, which reduce the set of intermediate data values $\beta_i$ to a set of output data $\phi_i$.

The techniques disclosed herein, such as the general process described with respect to FIG. 6, may utilize a mapreduce process. In general, in a mapreduce process, data may be divided into input data blocks that are processed by mappers. The mappers apply a map operation to the input to produce key-value pairs (e.g., such as feature-statistic pairs, as disclosed herein) as map output, and the map output is sent to reducers where values associated with the same key are combined to produce a final value for each key. Each reducer may be responsible for a subset of the keys. The process for distributing data to reducers may be referred to as shuffling, and may result in each reducer receiving, from each mapper, the key-value pairs for which the reducer is responsible. Further description and examples of mapreduce or machine learning and similar techniques are provided in U.S. Pat. Nos. 7,650,331 and 8,429,103, the contents of each of which are incorporated by reference herein for all purposes, in their entirety.

The techniques disclosed herein may be used to generate machine learned models using supervised learning data such as labeled examples. The labeled examples may be input into a machine learning system and the output from the machine learning system may be a machine learned model that contains weights that are generated in response to the labeled data. The labeled examples may contain both an outcome and properties associated with a specific instance. A machine learning system may receive labeled data (e.g., labeled examples) to train a machine learned model that contains weights that are generated in response to the supervised labeled data.

According to an implementation of the disclosed subject matter, a machine learning system may be used to generate and/or update models that are used to make regression based predictions and/or provide rankings. It will be understood that one or more of the components may be located either local to a single entity (e.g., computer, database, server, etc.) or may be located across multiple entities.

The present disclosure provides techniques based on feature templates and cross-templates. A template may be a category of feature-types and a template may include multiple features, all of which are from the same category. A template may be a single category of features (e.g., a base template) or multiple categories of features (e.g., a cross-template). A specific type of template may be a base template that is a single category of features. For example, a base template may be "language" and the features included in the template may be English, Spanish, French, German, Hindi, Italian, Japanese, and the like. Each of these features may be associated with a previous example that was received by the system. As another example, a base template may be "country" and the features included in the template may include United States, Canada, France, United Kingdom, Mexico, Japan, India, Italy, China, Australia, and the like. Yet another example may be the base template "keyword" that may include features such as "keyword:free" and "keyword:books". According to the present disclosure, regurgitation penalties may be applied to cross-templates. A cross-template may be another special type of template that is a cross of two or more base templates. A cross-template may be constructed from a combination of templates such as "country X keyword" which will include features such as "US X books" and "France X free". In machine learning models that may contain 100s of billions of features, a well performing model may have, for example, 100 or more total templates, many of which may be cross-templates containing 3 or more combinations of templates.

A cross-template may be constructed from a combination of templates by generating a cross product by crossing all of the features from one template with all of the features from another template. For example, a template "country" may be crossed with a template "keyword". The template "country" may include the features "United States", "Canada", and "France" and the template "keyword" may include the features "books", "free", and "dog." A cross product template "country X keyword" would include the features "United States X books", "Canada X books", "France X books", "United States X free", "Canada States X free", "France X free", "United States X dog", "Canada X dog", and "France X dog". Each of these features in the cross template may be associated with examples in which the feature occurred. For example, a statistic associated with the feature "United States X books" would be based on examples in which both features "United States" and "books" were present. A cross template may be constructed from any number of templates; however, as the number of templates included in a cross template increase, the number of relevant examples may decrease. For example, in contrast to the cross template "country X keyword" described above, there may be a relatively small number of examples associated with a cross template "country X keyword X language X gender X ad ID X video ID" since there may be only a few number of examples in which features from all the templates "country", "keyword", "language", "gender", "ad ID", and "video ID" occurred. In some cases, a cross-template may be constructed based on self-crossing of a template. For example, the template "keyword" may include the features "plasma" and "TV". The system may have received 6 examples including the feature "plasma", 18 examples including the feature "TV" and among all these examples, 2 examples may include both the features "plasma" and "TV". The template "keyword" may be crossed with the template "keyword" in which case the relevant examples would be restricted to examples in which 2 or more features from the keyword template are included such as the 2 examples that included both features "plasma" and "TV".

Figure 3:
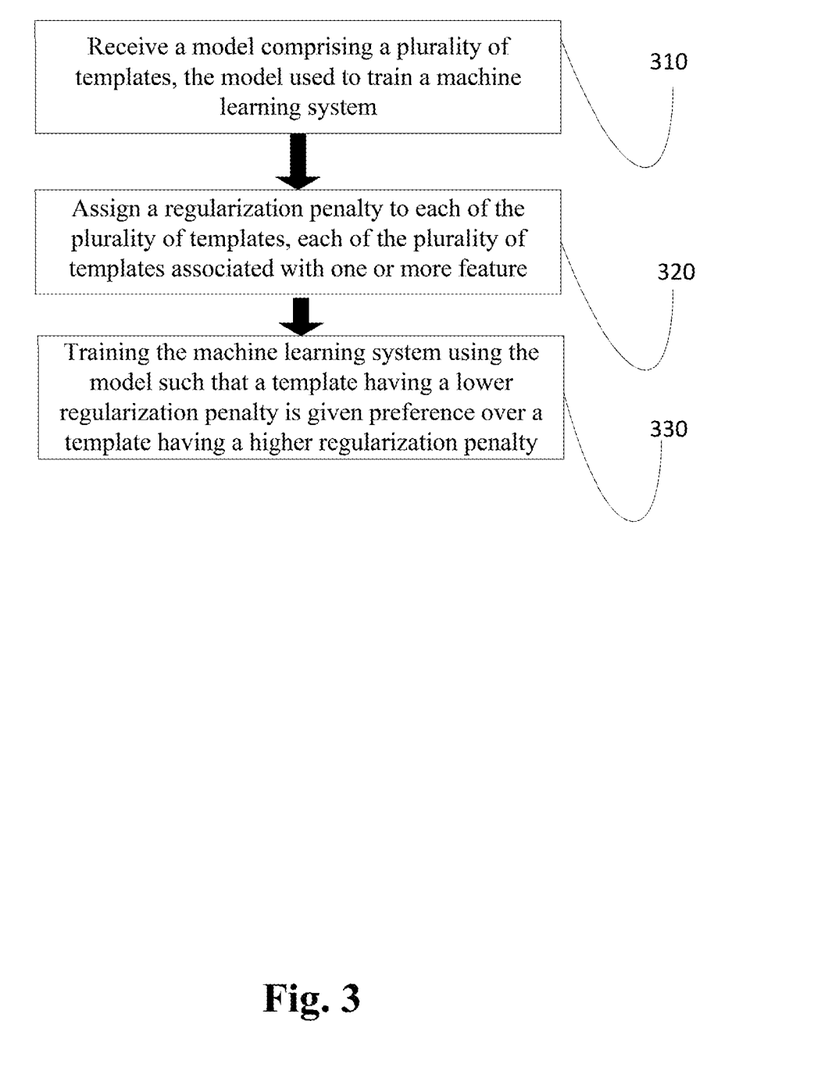
FIG. 3 shows an example process of training a machine learned model, according to an implementation of the disclosed subject matter.

According to an implementation of the disclosed subject matter, as shown in FIG. 3, at step 310, a model comprising a plurality of templates (e.g., base templates and/or cross-templates) may be received. The model may be generated using a machine learning system that is trained using labeled examples, as disclosed herein. According to an implementation, each template may be associated with a feature and each feature may have a weight associated with the feature. For example, a feature video_ID: 123_X_country:US may be associated with the template videoID X language and may have a weight of 0.4 associated with it. Notably, the model containing weighted features may be used to make predictions such as, for example, how likely a viewer that has selected a given language is to select a video that corresponds to a given videoID.

At step 320, a regularization penalty may be assigned to each of the templates. A regularization penalty may control model complexity and improve model generalization such that a model trained by applying regularization penalties based on domain knowledge (e.g., based on historic data and/or user input) may be better suited to be applied to a distribution of data that is different than the training data used to train the machine learning model. Machine learning models may be trained using labeled examples that are not representative of the distribution that the model will be applied to. As a specific example, a machine learning model may be generated based on example training data that contains data corresponding to video A through video G (i.e, video A, video B, video C . . . ). The trained machine learning model may be used to make predictions regarding the likelihood that a user will select a video for viewing. For example, the machine learned training model may be trained to predict whether a user associated with features 1, 2 and 3, is likely to view video B. However, the machine learning model may be used to predict whether a user is likely to view videos (e.g., videos H and I) in addition to the videos on which the machine learning model was trained on (i.e., video A through video G). Here, the machine learning model that is trained on a set of learned examples may not perform as well when applied to examples that the model was not trained on (e.g., videos H and I).

It will be understood that although viewing videos is used as an example for training a machine learning model and making predictions based on that model, any regression, ranking, rating, conversion, rate, count, probability, and/or the like may be predicted using the techniques disclosed herein.

According to implementations of the disclosed subject matter, domain knowledge may be used to modify a regularization penalty to control how a machine learning model is applied to unlabeled examples. The application of regularization penalties may result in counteracting a mismatch between the training data and data for which the model makes predictions. Domain knowledge may provide insights regarding templates and/or features such as the discrepancies in actions that result between features in a template. As an example, a specific set of search results, set A, may be selected more often by users associated with language 1 in comparison to users associated with language 2. Accordingly, regularization penalties may be applied to a machine learning model generated using only examples corresponding to users associated with language 1. A regularized machine learning model may be better suited to make predictions based on examples that contain features different than the labeled examples used to train the machine learning model.

As an illustrative example, a video with an unusually high view rate that has only been served in the United States may have the following features: {video_id:123, video_ID_X_country:123_X_US}. It should be noted that these features correspond to the templates {video_ID, video_ID_X_country}, respectively. The feature 'video_id:123' may correspond to the identification associated with the video (i.e., 123) and the feature 'video_ID_X_country:123_X_US' may correspond to the video 123 being viewed in the United States. A machine learning system may be trained on the video and its corresponding view rate and, based on the unusually high view rate, the machine learning system generates a model that assigns positive weights to both features to indicate that the view rate is good for this video. However, the machine learning model may not distinguish between the weight distributions such that one feature is assigned a higher weight than the other as, without regularization penalties, for example, an equal weight may be distributed across both features. Continuing the example, the video may be served in another country (e.g., France). The model may be applied to features {video_id:123, video_id_X_country:123_X_FR} such that the positive weight from video_ID may boost the prediction, and may result in a prediction that is incorrectly too high. Domain knowledge may indicate that the view rate of videos typically behave differently in different countries such that a model may be optimized by weighing the template video_ID_X_country (e.g., 123_X_US, 123_X_FR, etc.) to predict results more so than the template video_ID (e.g., video_123).

A regularization penalty may be assigned to a template such that the model trained using the regularization penalty may amplify or reduce the emphasis placed on features associated with the template. A higher regularization penalty may correspond to less emphasis placed on a feature associated with a template and a lower regularization penalty may correspond to more emphasis placed on a feature associated with a template. Continuing the previous example, a higher regularization penalty may be assigned to the template 'video_ID' and a lower regularization penalty may be assigned to the template 'video_ID_X_country' such that the model emphasizes features associated with the template 'video_ID_X_country' more so than features associated with 'video_ID'. As a specific example, the regularization penalty associated with 'video_ID' may be 2 whereas the regularization penalty associated with 'video_ID_X_country' may be 0.5. The disproportionate regularization penalties may encourage the model to make predictions in a more generalized sense. As a more specific example, by assigning a lower regularization penalty to the template 'video_id_X_country', a model may be trained to predict that there is a higher probability that a user may view the video (i.e., the video corresponding to video_ID:123) based on the 'user viewing the video in the United States' more so than 'a user viewing the video'. Notably, the template 'video_ID_X_country' may be less regulated and, thus, more emphasized compared to the template 'video_ID'. Subsequently, the model may be used to predict whether a user in France views the video such that the features associated with this example are: {video_ID:123, video_ID_X_country:123_X_FR}. Because the feature 'video_ID:123' was not weighed highly (i.e., the model was trained by placing a lower emphasis on the template 'video_ID'), a prediction given the features {video_ID:123, video_ID_X_country:123_X_FR} will be lower than if no restriction penalty was applied. Essentially, the model may not predict that a 'user may view the video in France' as highly based on the training that a user is highly probable to view the video in the United States.

According to implementations of the disclosed subject matter, a more emphasized template (i.e., a template with a lower regularization penalty) may be accentuated by amplifying the weight associated with the template. As an example, if a template X has an original weight of 0.4, a lower regularization penalty may amplify the weight to 0.6 such that template X is emphasized. A less emphasized template (i.e., a template with a higher regularization penalty) may be dampened by reducing the weight associated with the template. As an example, if a template Y has an original weight of 0.4, a higher regularization penalty may amplify the weight to 0.2 such that template Y is less emphasized. A more emphasized template may correspond to a prediction more so than a less emphasized template. As an example, template X in the previous examples may contribute to a prediction more so than template Y as the template X may be weighted higher. It will be understood that the weight amplification and/or dampening may be applied in any manner such that amplification emphasizes a template whereas a dampening deemphasizes it.

Figure 7A:
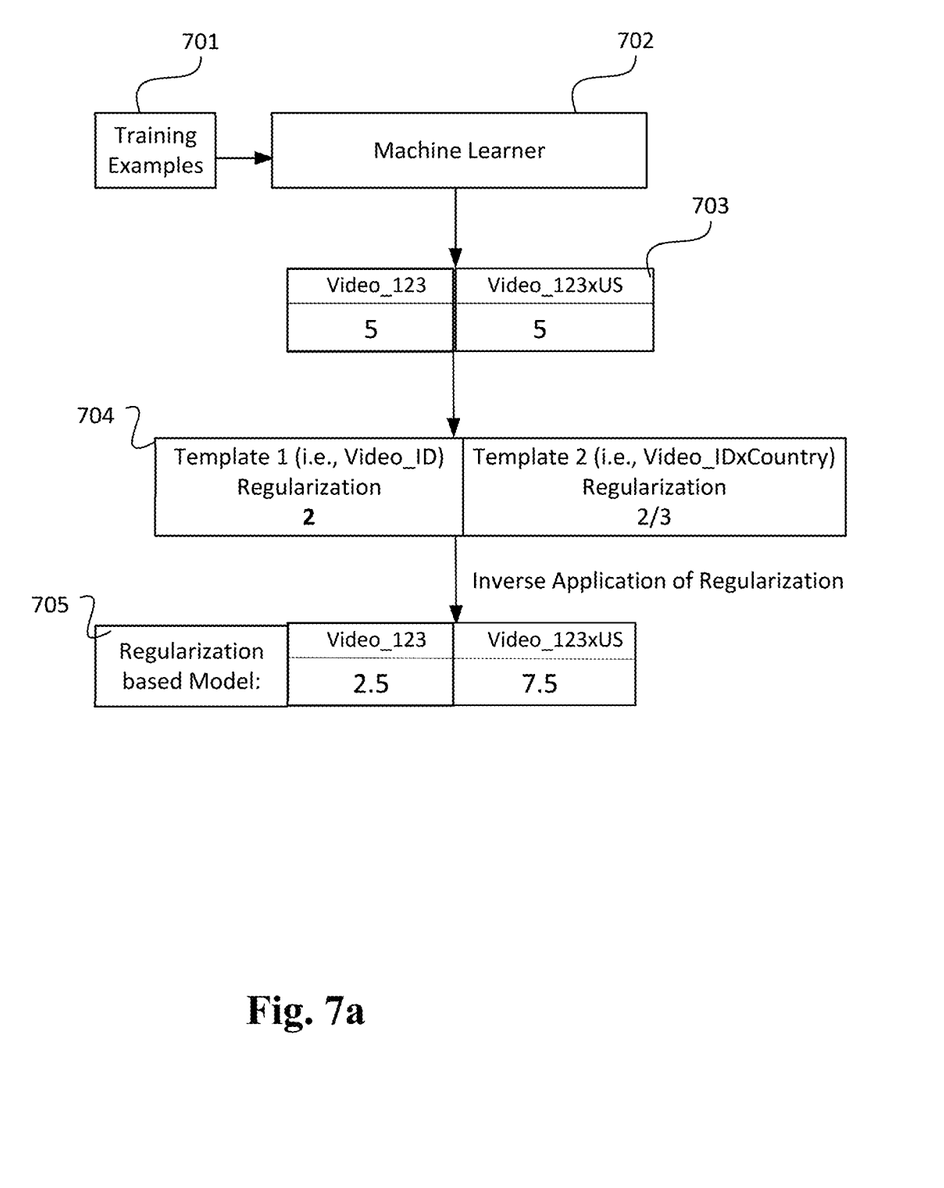
FIG. 7a shows an example regularized model, according to an implementation of the disclosed subject matter.

In an illustrative example of the disclosed subject matter, as shown in FIG. 7*a*, training examples 701 may be provided to a machine learner 702. The training examples may contain data that corresponds to users located in the United States viewing video_123 at a high rate. Based on the techniques disclosed herein, the machine learner 702 may generate weights for the features {video_ID:123, video_ID_X_country:123_X_US} such that, since the training examples only contained examples for users located in the United States viewing video_123 at a high rate, the weight for feature 'video_ID:123' and feature 'video_ID_X_country:123_X_US' is the same: 5, as shown at 703. Notably, according to this example, the machine learned model may not distinguish between whether a user viewed the video or a user viewed the video in the United States and, thus, may weigh them equally. In this example, the template 'Video_ID' may correspond to a regularization penalty of 2 and the template 'Video_ID_X_Country' may correspond to a regularization penalty of ⅔, as shown at 704, such that more emphasis is to be placed on template 'Video_ID_X_Country' then template 'Video_ID'. The regularization penalties may be based on historic data corresponding to a higher deviation in probabilities based on features associated with template 'Video_ID_X_Country' and a lower deviation in probabilities placed on features associated with template 'Video_ID'. Accordingly, the regularization penalties may be inversely applied to the weights 703 (i.e., Video_123: 5/2 and Video_IDxCountry:5/(⅔)), resulting in a regularized model 705 with the weight for the feature 'Video_123' equal to 2.5 and the weight for the feature 'Video_123xUS' equal to 7.5. Notably, in the regularized model, the feature 'Video_123' may be less emphasized than the feature 'Video_123xUS'.

Figure 5:
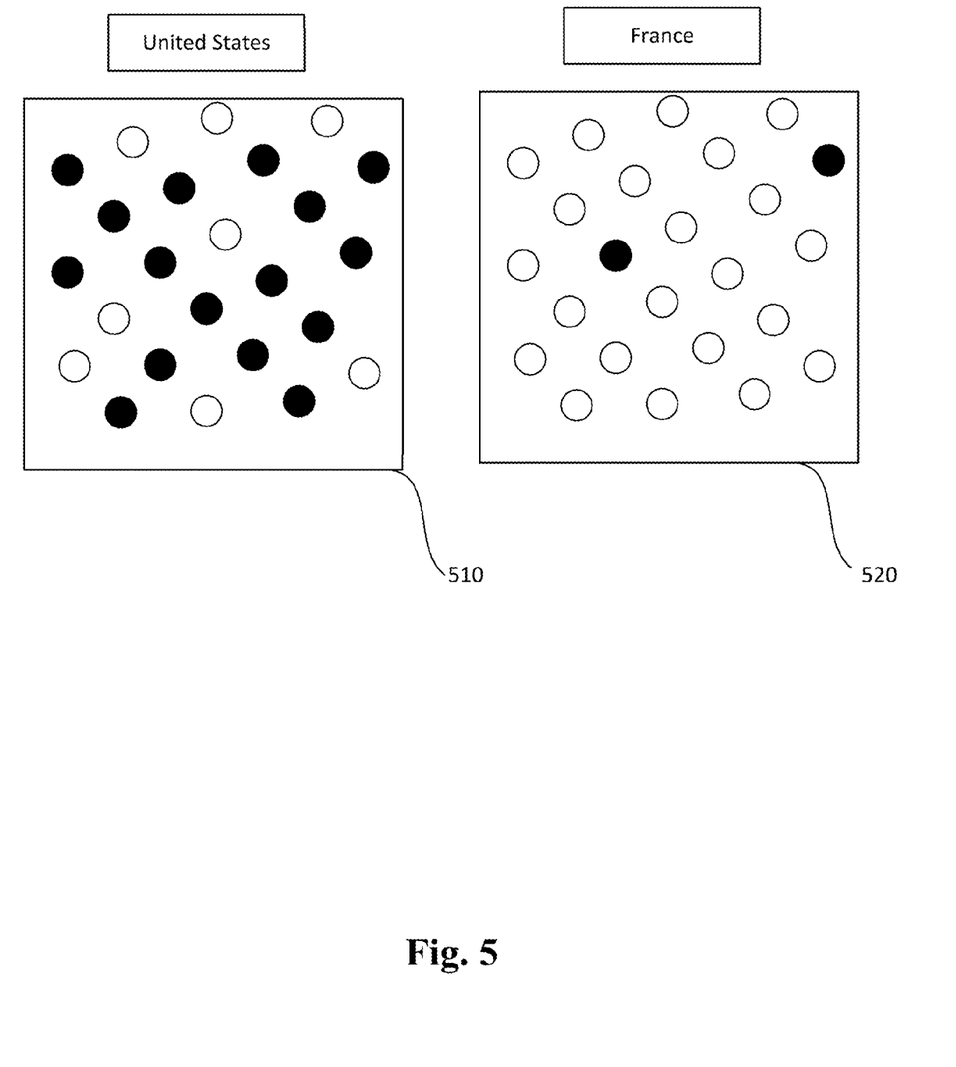
FIG. 5 shows an example illustration of percentages of users in different countries that view a video, according to an implementation of the disclosed subject matter.
Figure 7B:
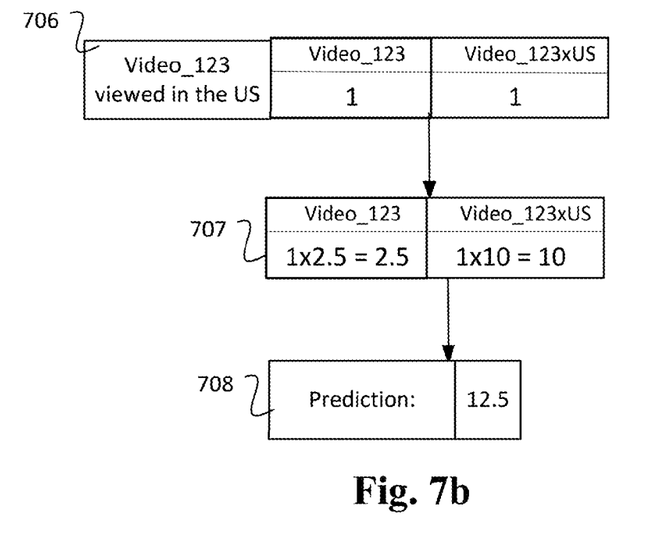
FIG. 7b shows an example prediction based on a regularized model, according to an implementation of the disclosed subject matter.
Figure 7C:
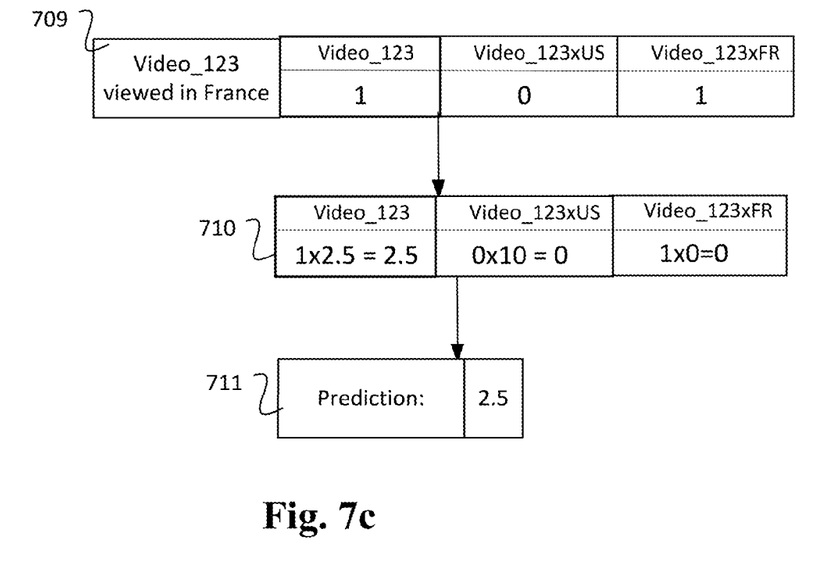
FIG. 7c shows an example prediction based on a regularized model, according to an implementation of the disclosed subject matter.

As shown in FIGS. 7b and 7c, predictions for unlabeled examples may be generated using the regularized model of FIG. 7a. As shown in FIG. 7b, the model of 7a may be applied to an example with features 'Video_123' and 'Video_123_X_US', at 706, such that the model may predict the probability that a user in the US views the video 123. The model may be applied to 706 such that the Boolean value associated with the feature 'Video_123' is 1, resulting in the weight 2.5 associated with feature 'Video_123' being multiplied by 1 resulting in 2.5. Similarly, the Boolean value associated with the feature 'Video_123xUS' is 1, resulting in the weight 10 associated with feature 'Video_123xUS' being multiplied by 1 resulting in 10. Accordingly, the probability value for a user in the US viewing the video 123 is 12.5 (i.e., 2.5+10), or may be within a range [0,1] based on the value 12.5. As shown in FIG. 7c, the model of 7a may be applied to an example with features 'Video_123' and 'Video_123 X_FR', at 709, such that the model may predict the probability that a user in France views the video 123. The model may be applied to 709 such that the Boolean value associated with the feature 'Video_123' is 1, resulting in the weight 2.5 associated with feature 'Video_123' being multiplied by 1 resulting in 2.5. Similarly, the Boolean value associated with the feature 'Video_123xUS' is 0 (i.e., the user in this example is not located in the US), resulting in the weight 10 associated with feature 'Video_123xUS' being multiplied by 0 resulting in 0. Similarly, the Boolean value associated with the feature 'Video_123xFR' is 1 (i.e., the user in this example is located in France). As the model does not contain a weight for the feature Video_123xFR', the resulting weight associated with feature 'Video_123xFR' may be 0 (i.e., 1x0). Accordingly, the probability value for a user in France viewing the video 123 is 2.5 (i.e., 2.5+0+0) or may be within a range [0,1] based on the value 2.5. As shown in FIG. 5, the percentage of viewers that view video_123 in the United States 510 may be significantly higher than the percentage of viewers that view the same video_123 in France 520. The regularized model trained only on labeled examples corresponding to the United States users maybe more accurate when predicting the probability that a viewer in either country is likely to view the video_123. Notably, using regularization penalties, a model may be trained to be generalized based on domain knowledge such that features not contained in the model may be more accurately predicted.

According to implementations of the disclosed subject matter, domain knowledge may be generated based on historic data and/or based on input by a user. Domain knowledge generated based on historic data may correspond to a result of analyzing the deviation between successful predictions made for features associated with the same template. As an example, if the arrangement successfully predicts that a user may select a search result, regardless of the default language selected by the user, then the template 'language' may be designated as a stable template. A regularization penalty associated with a stable template may be high such that the emphasis placed on the template 'language' is lower than that of an unstable template. As another example, if the location of a user is a relevant factor of whether the user selects a search result, then the template 'location' may be designated as an unstable template. A regularization penalty associated with an unstable template may be low such that the emphasis placed on the template 'location' is higher than that of an unstable template. Alternatively, domain knowledge may be provided by a user such that, for example, a developer may provide domain knowledge values for one or more templates.

According to an implementation of the disclosed subject matter, a restrictive regularization penalty may be assigned to a template based on an occurrence value associated with features corresponding to the template. The restrictive regularization penalty for a template may be a high regularization penalty such that weights for features associated with the template may not be emphasized when making a prediction based on the features. The restrictive regularization penalty may be assigned to the template as long as the occurrence value associated with the features corresponding to the template is below a stability threshold. The restrictive regularization penalty may be modified to a lower regularization penalty if the occurrence value associated with the features corresponding to the template meets or exceeds the stability threshold.

Figure 4:
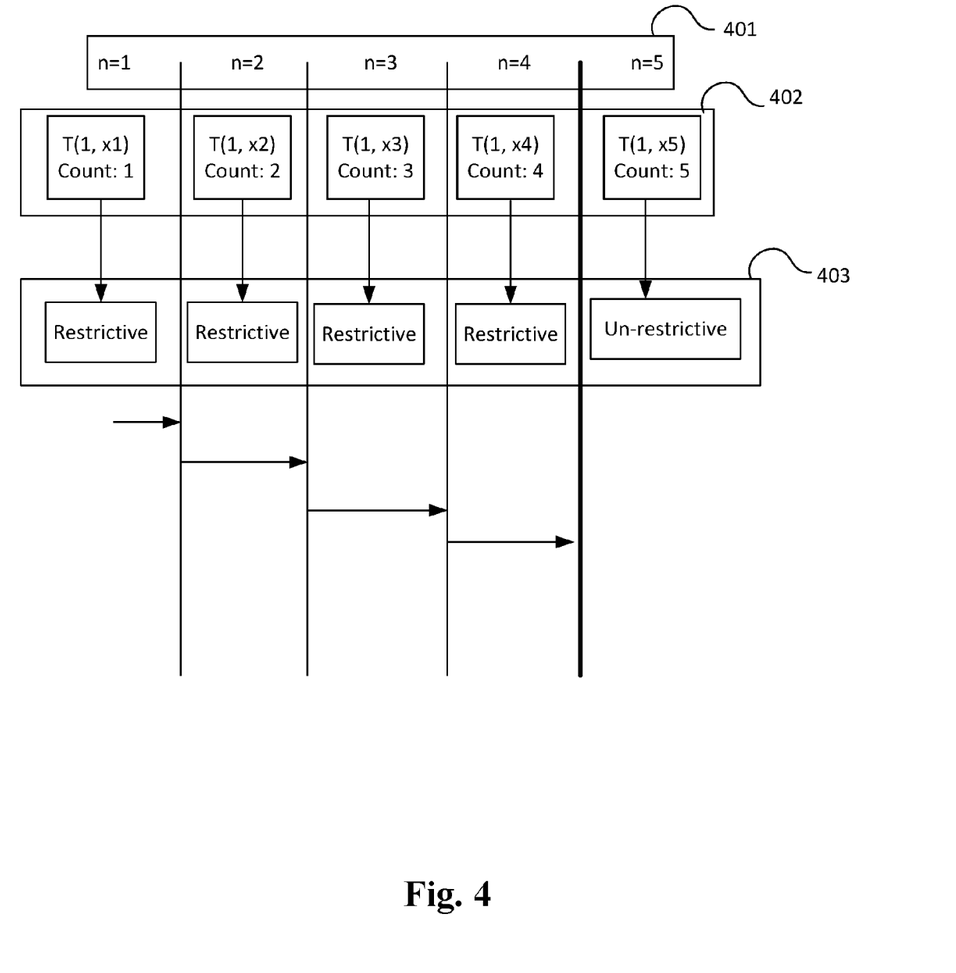
FIG. 4 shows an example illustration for assigning a regularization penalty based on a stability threshold, according to an implementation of the disclosed subject matter.

As a specific example, a stability threshold for training a machine learning system may be 5 occurrences of distinct features associated with a template. An example of distinct features associated with the template 'language' are 'English', 'Spanish', 'French', 'German', 'Chinese', 'Hindi', etc. Essentially, a template may be associated with multiple features (e.g., 100s of millions distinct features) and an occurrence of a distinct feature may occur when a previously unused feature is used to train a machine learning model. As an example, a restrictive regularization penalty may be assigned to the template 'Country' if labeled examples used to train a machine learning model contain less than 5 occurrences of distinct occurrences of features associated with the template 'Country'. More specifically, if the labeled examples all correspond to users located in the United States (i.e., a single distinct occurrence of features associated with the template 'Country'), then a restrictive regularization penalty may be assigned to the template 'Country'. If additional labeled examples are used to train the machine learning model such that the labeled examples include users in the United States, France, Germany, Italy, China, and Japan, then the restrictive regularization penalty may be lowered such that the weights for features associated with the template 'Country' are emphasized more than with the restrictive regularization penalty. In an illustrative example, as shown in FIG. 4, distinct occurrences 401 (i.e., n=1 to n=5) may represent instances of additional distinct occurrences in labeled examples such that n=2 corresponds to two distinct occurrences and n=3 corresponds to three distinct occurrences, etc. The occurrence counter 402 may correspond to distinct features x1, x2, x3, x4, and x5 for Template T(1) such that the count is increased by 1 for when a distinct feature for template T(1) occurs in one or more labeled examples. The penalty designator 403 corresponds to the restriction level such that a 'Restrictive' penalty is a high penalty such that weights for features associated with template T(1) are not emphasized and a 'Un-restrictive' penalty is a lower penalty such that the weights for features associated with template T(1) are emphasized. As shown, if the stability threshold is 5, then the penalty for features associated with template T(1) is high and, at n=5, when the number of occurrences meets the stability threshold of 5, the penalty is reduced to an 'Un-restrictive' penalty.

Figure 1:
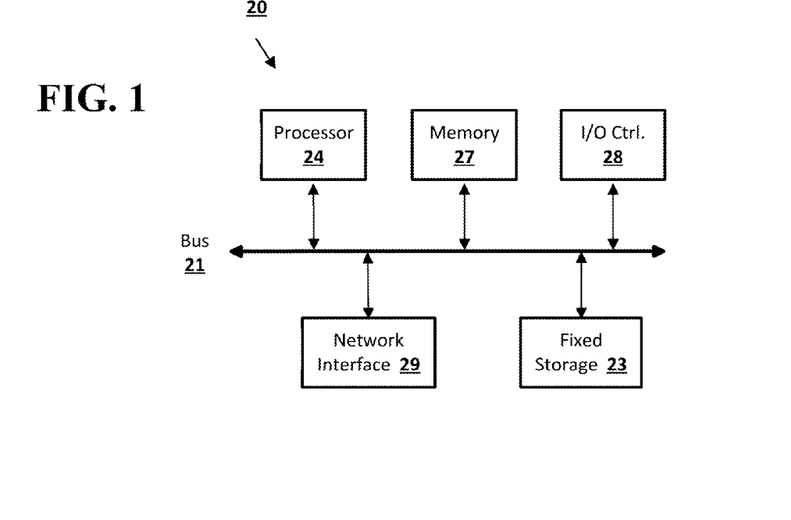
FIG. 1 shows a computer according to an implementation of the disclosed subject matter.

Implementations of the presently disclosed subject matter may be implemented in and used with a variety of component and network architectures. FIG. 1 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 2.

Many other devices or components (not shown) may be connected in a similar manner, such as document scanners, digital cameras, auxiliary, supplemental, or backup systems, or the like. Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 2:
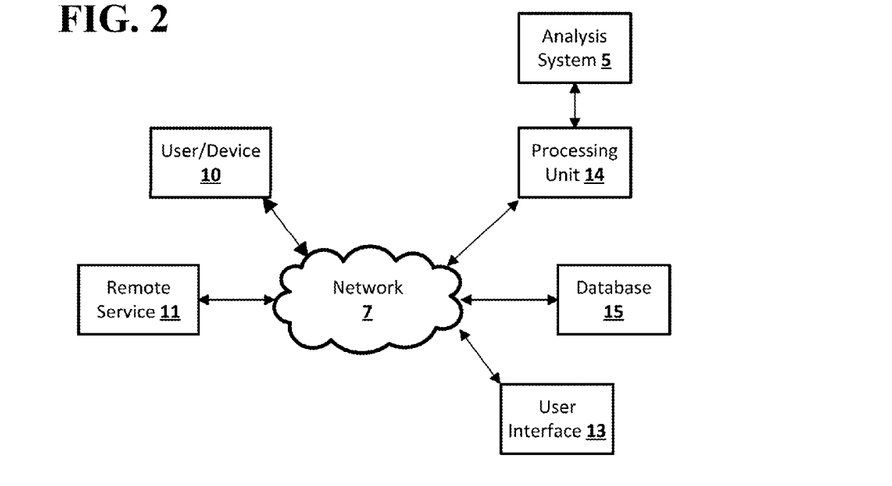
FIG. 2 shows a network configuration according to an implementation of the disclosed subject matter.

FIG. 2 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method of training a machine learning model on labeled examples, wherein the machine learning model is configured to receive an example having a plurality of features and to generate a predicted output for the received example, the method comprising:
   obtaining data defining a plurality of templates, wherein each template corresponds to one or more categories of features;
   assigning a respective regularization penalty to each of the plurality of templates; and
   training the machine learning model on the labeled examples, comprising, for each labeled example and for each of the plurality of templates:
      determining, using the machine learning model, a respective weight for the template based on the features of the labeled example that belong to the one or more categories that correspond to the template, and
      modifying the respective weight for the template by applying the respective regularization penalty for the template to the respective weight for the template determined by the machine learning model, wherein, during the training, a template having a lower regularization penalty is emphasized over a template having a higher regularization penalty.

2. The method of claim 1, wherein the respective regularization penalty for each of the templates is based on domain knowledge.

3. The method of claim 2, wherein the domain knowledge corresponds to historic data associated with at least one feature associated with the template.

4. The method of claim 2, wherein the domain knowledge is provided by a user.

5. The method of claim 1, further comprising:
determining that, for a first template, a number of occurrences of distinct features belonging to the one or more categories corresponding to the first template is below a stability threshold; and
assigning a restrictive regularization penalty to the first template based on the determination.

6. The method of claim 1, further comprising:
determining that, for a first template, a number of occurrences of distinct features belonging to the one or more categories corresponding to the first template meets or exceeds a stability threshold; and
modifying the regularization penalty for the first template from a higher regularization penalty to a lower regularization penalty, based on the determination.

7. The method of claim 1, wherein the example characterizes a setting for presenting a content item to a user and the predicted output is a prediction of a likelihood of a user selection of the content item.

8. The method of claim 7, further comprising selecting a content item to provide for presentation to the user based on the predicted output.

9. A system comprising:
one or more computers and one or more storage devices storing instructions that when executed by the one or more computers cause the one or more computers to perform operations comprising:
obtaining data defining a plurality of templates, wherein each template corresponds to one or more categories of features;
assigning a respective regularization penalty to each of the plurality of templates; and
training the machine learning model on the labeled examples, comprising, for each labeled example and for each of the plurality of templates:
determining, using the machine learning model, a respective weight for the template based on the features of the labeled example that belong to the one or more categories that correspond to the template, and
modifying the respective weight for the template by applying the respective regularization penalty for the template to the respective weight for the template determined by the machine learning model,
wherein, during the training, a template having a lower regularization penalty is emphasized over a template having a higher regularization penalty.

10. The system of claim 9, wherein the respective regularization penalty for each of the templates is based on domain knowledge.

11. The system of claim 10, wherein the domain knowledge corresponds to historic data associated with at least one feature associated with the template.

12. The system of claim 10, wherein the domain knowledge is provided by a user.

13. The system of claim 9, the operations further comprising:
determining that, for a first template, a number of occurrences of distinct features belonging to the one or more categories corresponding to the first template is below a stability threshold; and
assigning a restrictive regularization penalty to the first template based on the determination.

14. The system of claim 9, the operations further comprising:
determining that, for a first template, a number of occurrences of distinct features belonging to the one or more categories corresponding to the first template meets or exceeds a stability threshold; and
modifying the regularization penalty for the first template from a higher regularization penalty to a lower regularization penalty, based on the determination.

15. The system of claim 9, wherein the example characterizes a setting for presenting a content item to a user and the predicted output is a prediction of a likelihood of a user selection of the content item.

16. The system of claim 15, the operations further comprising selecting a content item to provide for presentation to the user based on predicted output.

17. A non-transitory computer readable medium encoded with a computer program comprising instructions that when executed by one or more computers cause the one or more computers to perform operations comprising:
obtaining data defining a plurality of templates, wherein each template corresponds to one or more categories of features;
assigning a respective regularization penalty to each of the plurality of templates; and
training the machine learning model on the labeled examples, comprising, for each labeled example and for each of the plurality of templates:
determining, using the machine learning model, a respective weight for the template based on the features of the labeled example that belong to the one or more categories that correspond to the template, and
modifying the respective weight for the template by applying the respective regularization penalty for the template to the respective weight for the template determined by the machine learning model,
wherein, during the training, a template having a lower regularization penalty is emphasized over a template having a higher regularization penalty.

18. The non-transitory computer readable medium of claim 17, wherein the respective regularization penalty for each of the templates is based on domain knowledge.

19. The non-transitory computer readable medium of claim 17, the operations further comprising:
determining that, for a first template, a number of occurrences of distinct features belonging to the one or more categories corresponding to the first template is below a stability threshold; and
assigning a restrictive regularization penalty to the first template based on the determination.

20. The non-transitory computer readable medium of claim 17, the operations further comprising:
determining that, for a first template, a number of occurrences of distinct features belonging to the one or more categories corresponding to the first template meets or exceeds a stability threshold; and
modifying the regularization penalty for the first template from a higher regularization penalty to a lower regularization penalty, based on the determination.

* * * * *